H. F. Bond,
Wick Trimmer,
N°45,692. Patented Jan. 3, 1865.
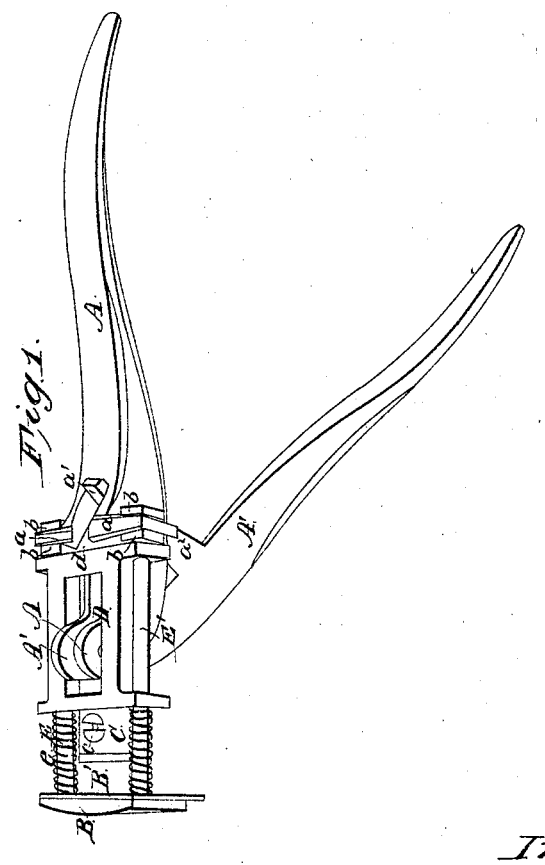
Witnesses:
Wm. F. Sprague
Edward L. Hee
Inventor:
Henry F. Bond

UNITED STATES PATENT OFFICE.

H. F. BOND, OF WALTHAM, MASSACHUSETTS.

DEVICE FOR TRIMMING LAMP-WICKS.

Specification forming part of Letters Patent No. 45,692, dated January 3, 1865.

*To all whom it may concern:*

Be it known that I, H. F. BOND, of Waltham, in the county of Middlesex and State of Massachusetts, have invented a new and useful Improvement on a Machine for Trimming Lamp-Wicks; and I do hereby declare that the following is a full, clear, and exact description of the construction and operation of the same, reference being had to the annexed drawings, making a part of this specification.

In Figure 1, which is a perspective view of my device, A and A' represent the two handles, resembling somewhat those of ordinary pliers, and are pivoted to each other at P. The upper handle, A, has attached to it a lug or short arm, a, which projects at right angles therefrom, as shown, on both sides. To these arms a, near their outer ends, are secured two small bolts or rods, E and E, which project forward parallel with the arm A, and which are secured by the nuts b b. These rods E and E are united at their opposite ends by a metallic block, B', which is faced with copper, as indicated by B. A rectangular frame, D, the construction of which is clearly shown in the drawings, Fig. 1, is mounted on the rods E and E' so as to slide readily thereon back and forth. A spiral spring, e, is coiled around each of the rods, and tends to keep the frame D shoved back in the position shown in Fig. 1. To the front of the frame D is secured a knife, C, which is curved as shown in Fig. 2, and which is so attached as to bring its edge against the face of the copper strip B when the frame D is shoved forward. The lower handle, A', has projecting at a right angle, or nearly so, from it an arm, a', which arm, working through an elongated hole or opening in handle A, comes in contact with the rear end of the sliding frame D, and when the handles A and A' are pressed together forces the frame D forward, thereby bringing the knife C in contact with the copper strip B and, of course, cutting off the wick or any substance that may be between them. Upon releasing the handles the springs e e immediately force the frame and knife back again to their original position, ready for another cut.

The advantages of my invention are that by it the wick can be cut in a true and uniform shape, which is absolutely necessary to cause the lamp to burn steadily and without smoke, and it can be more readily and accurately adjusted to lamps for cutting the wick truly than shears or similar implements.

Having thus described my invention, what I claim is—

The lamp-trimming device, constructed and operating as herein set forth.

HENRY F. BOND.

Witnesses:
 EDMUND L. HILL,
 WM. G. SPRAGUE.